UNITED STATES PATENT OFFICE 2,470,108

HETEROCYCLIC AMINES

John Thomas Plati, Passaic, and Wilhelm Wenner, Montclair, N. J., assignors to Hoffmann-La Roche Inc., Nutley, N. J., a corporation of New Jersey No Drawing. Application January 11, 1947, Serial No. 721,672

3 Claims. (Cl. 260—297)

This invention relates to a new group of heterocyclic amines and to their method of production. Our new heterocyclic amines are more particularly characterized by the following general formula:

(I)

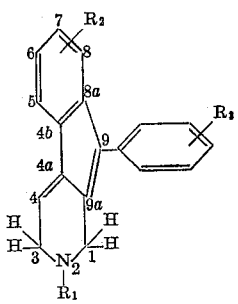

wherein $R_1$ is an alkyl group such as, for example, methyl, ethyl, propyl, isopropyl, butyl, isobutyl, tertiary-butyl, amyl and the like; $R_2$ and $R_3$ are hydrogen, an alkyl group, such as methyl, ethyl, propyl, isopropyl, butyl, isobutyl, t-butyl, amyl, and the like, or an alkoxy group as for example, methoxy, ethoxy, propyloxy, and the like.

We have assigned the name "2-alkyl-9-phenyl-dihydro-1-pyridindenes" to the new class of compounds since they may be regarded as derivatives of the hypothetical basic ring system which can be represented by the following formula:

(A)

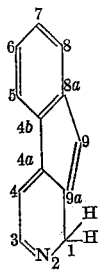

We have given the name "1-pyridindene" to this basic ring system A, indicating by this nomenclature its structure as derived from a combination of the ring systems pyridine and indene. It is to be understood that by the expression "2-alkyl-9-phenyl-dihydro-1-pyridindenes," as employed herein and in the claims we include the compounds wherein the phenyl ring and the pyridindene nucleus are unsubstituted or substituted.

Our invention also embraces the hydrogenated derivatives of the 2-alkyl-9-phenyl-dihydro-1-pyridindenes, such as, for example, the 2-alkyl-9-phenyl-tetrahydro-1-pyridindenes and the 2-alkyl-9-phenyl-hexahydro-1-pyridindenes. To the compounds of type I and their hydrogenated derivatives, we have assigned the generic name "2-alkyl-9-phenyl-hydro-1-pyridindenes," by which term as employed herein and in the claims we include the compounds wherein the phenyl ring and pyridindene nucleus are unsubstituted or substituted.

The new compounds of type I can readily be prepared by a short, smoothly-functioning synthesis from cheap starting materials.

In one embodiment of our invention we employ as a starting material a pipridine compound of the following formula:

(II)

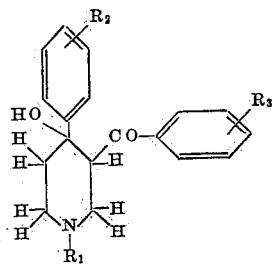

and treat it with a cyclizing and dehydrating agent to form the compound of type I. In Formula II, $R_1$, $R_2$ and $R_3$ have the same significance as in Formula I. The synthesis is illustrated by the preparation of the simplest compound of Formula I wherein $R_1$ is methyl, and $R_2$ and $R_3$ hydrogen, which proceeds according to the following schematic equation:

The starting compound III can be prepared by reacting formaldehyde, methylamine hydrochloride and acetophenone. According to Mannich and Heilmer (Ber. 55, 356, 362 [1922]), formaldehyde, methylamine hydrochloride and acetophenone when boiled in alcohol react with the formation of a diketoamine (V). Warnat (C. A. 31, 2592 [1937]) found later that the Mannich and Heilner reaction not only yields the diketoamine (V)

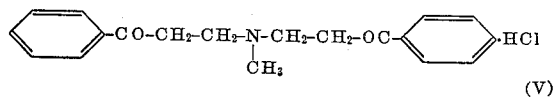

(V)

described by Mannich and Heilner, but proved that the reaction product contains in addition, the piperidine compound III, 1-methyl-3-benzoyl-4-phenyl-4-hydroxy-piperidine, a fact which was further confirmed by Mannich and Hieronimus (Ber. 75, 49 (1942)). Our own investigations of the synthesis of pyridindenes of type I have lead to a greatly improved method of synthesizing not only for the compound of Formula III, but also for new compounds of this type. This method forms the subject matter of our application Serial Number 721,674, filed January 11, 1947. We have found that the crude product of the reaction between formaldehyde, methylamine hydrochloride and acetophenone, which, according to the references above, comprises a mixture of the hydrochloride of the ketoamine compound of Formula V and the hydrochloride of the compound of Formula III, is converted almost completely into the cyclic compound of Formula III, if the reaction mixture is made alkaline as, for example, with sodium hydroxide in aqueous solution and allowed to stand over a period of time ranging up to 24 hours. Thus the base III is obtained in high yields as a crystalline compound which can be recrystallized from methanol.

Furthermore, our investigations have led to other methods of condensing the formaldehyde, methylamine hydrochloride, and acetophenone which are superior to the ones described in the references cited above. These form the subject of our application Serial Number 721,673, filed January 11, 1947. Thus we have found that if the condensation is carried out in the absence of the alcohol, the reaction goes forth very vigorously with a considerable increase in the yield of the diketoamine V. We have found also, that if an excess of the acetophenone is employed as a diluent, yields of the diketoamine are also considerably increased. In another modification we have found that if we employ a chlorinated hydrocarbon, such as carbon tetrachloride, chloroform, and particularly tetrachloroethane as the diluent, instead of alcohol, large yields of the diketoamine of Formula V are also obtained. The employment of tetrachloroethane is attended by the important advantage that the water formed during the reaction can be readily removed by distilling part of the tetrachloroethane, thereby increasing the yield of the diketoamine. Furthermore, the reaction product is almost insoluble in this solvent, thus obviating the recovery of the material by concentration of the mother liquors.

While our new procedure of condensation has been illustrated above in terms of the condensation between formaldehyde, methylamine hydrochloride and acetophenone, it is equally applicable to the production of salts of diketoamines represented by the general formula:

(VI)

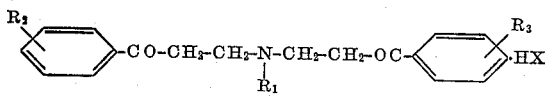

wherein $R_1$, $R_2$ and $R_3$ have the same significance as already assigned thereto, and X is a monovalent acid radical. Thus in general, we can react a primary amine in the form of its salts, a formaldehyde such as formaldehyde, or a formaldehyde-yielding compound as, for example, formalin, paraformaldehyde, formaldehyde bisulfite, formaldehyde diethyl acetal, and the like with an acetophenone such as acetophenone or its ring-substituted derivatives such as alkyl- and alkoxy-acetophenone, as, for example, methyl - acetophenone, ethyl - acetophenone, methoxy - acetophenone, ethoxy - acetophenone and the like. Examples of suitable primary amines, in addition to methylamine, are ethylamine, isopropylamine, butylamine and the like.

In any event, either the crude reaction product (resulting from the condensation when an alcohol is employed as a solvent, or our new procedures of condensation) as well as the purified diketoamine of Formula VI, can be converted into the piperidine of Formula II by the aqueous alkaline treatment above mentioned. The resulting reaction product or the purified piperidine can then be converted into the pyridindene of Formula I.

From the above schematic equation, it will be seen that the synthesis of our new heterocyclic base comprising the conversion of compound III into compound IV and more generally compounds of type II into compounds of type I, involves the elimination of two molecules of water from the starting material, thereby creating a new five-membered ring and introducing two double bonds into the molecule. This conversion is readily effected by subjecting the starting material to a cyclizing and dehydrating agent such as, for example, hydrobromic acid or sulfuric acid in aqueous solution. The reaction is preferably carried out at temperatures which may range, for example, from about 0° up to about 150° C. When sulfuric acid is employed, the starting material is treated with sulfuric acid of 50–100 per cent at temperatures ranging from about 0° to reflux. When employing hydrobromic acid, we find it advantageous to heat the starting material with this acid to a temperature of about 100° C., preferably to the reflux temperature of the mixture. In those cases where the starting compound of Formula II contains an alkoxy group, we prefer to employ sulfuric acid as the ring-closing agent, since it avoids the danger of splitting or hydrolyzing the alkoxy groups.

In general, the resulting dihydro-1-pyridindene compounds are isolated in the form of their salts, or by dissolving in water and precipitating the free bases with an alkali. Especially advantageous is the isolation of the compounds in the form of their hydrobromides, since the hydrobromides can be readily crystallized, being comparatively slightly soluble in water and dilute hydrobromic acid. If sulfuric acid is employed as the cyclizing agent, the compounds are best isolated as the free bases which are then converted into the hydrobromides.

In an alternative procedure for preparing the pyridindenes of type I, we have found that high yields can be also obtained if the original reaction product between the formaldehyde, primary amine salt, and the acetophenone is not first subjected to alkali to transform it completely into the piperidine compound II, but is directly treated with aqueous hydrobromic acid. We believe that the treatment with aqueous hydrobromic acid first results in the conversion of the diketoamine of Formula VI present in the reaction product into the piperidine derivative of type II and then cyclizes and dehydrates the latter compound to form the new compounds of type I. In the same manner the isolated N-di-(β-benzoylethyl)-alkylamines of Formula VI can be converted into the pyridindene.

The new compounds constitute an entirely new and valuable class of heterocyclic amines. They can be hydrogenated to form new and valuable 2-alkyl-9-phenyl-tetrahydro-1-pyridindenes and 2-alkyl-9-phenyl-hexahydro-1-pyridindenes, which are useful for therapeutic purposes. These hydrogenated compounds are strong bases which are soluble in most organic solvents. They form salts with acids which are readily soluble in water.

The following examples will serve to illustrate our invention:

Example 1

A mixture of 750 grams of 1-methyl-3-benzoyl-4-hydroxy-4-phenylpiperidine and 2500 cc. of 48% hydrobromic acid is refluxed for about 20 minutes. It is then poured into 8 liters of water. An oily precipitate appears which on standing crystallizes. It is filtered and crystallized from about 3.5 liters of alcohol. 2-methyl-9-phenyl-2,3-dihydro-1-pyridindene hydrobromide, M. P. 201–203° C., is obtained.

Example 2

16 grams of 1-methyl-3-benzoyl-4-hydroxy-4-phenyl-piperidine are dissolved in 50 cc. of sulfuric acid (65% by weight) and refluxed for about 30 minutes. After cooling the mixture is poured into water. The solution is made alkaline by addition of sodium hydroxide while cooling to about 30° C. An oil separates and is extracted with ether. The ether solution is saturated with gaseous hydrobromic acid. The hydrobromide separates. It is filtered and washed with acetone. 2-methyl-9-phenyl-2,3-dihydro-1-pyridindene hydrobromide is obtained, melting at 202–204° C.

Example 3

20 grams of 1-methyl-3-benzoyl-4-hydroxy-4-phenyl-piperidine are dissolved in 80 grams of 45% sulfuric acid (by weight) and warmed for three hours. The mixture is treated as in Example 2, yielding 2-methyl-9-phenyl-2,3-dihydro-1-pyridindene hydrobromide, M. P. 203–204° C.

Example 4

96 grams of isopropylamine hydrochloride, 240 grams of acetophenone, 120 grams of paraformaldehyde and 250 cc. of alcohol are refluxed for 6 hours. The solvent is distilled off under reduced pressure. To the residue about 400 cc. of ethylacetate are added. On standing and occasional scratching a crystalline precipitate is formed. It is filtered, suspended in 1000 cc. of water and the solution stirred with 200 cc. of 10% sodium hydroxide for about one hour. An oil appears, which on standing turns solid. It is recrystallized from about 300 cc. of methanol. 1-isopropyl-3-benzoyl-4-hydroxy-4-phenyl-piperidine is thus obtained in colorless crystals, M. P. 120–122° C.

Example 5

40 grams of the piperidine obtained as in Example 4 and 170 cc. of 48% hydrobromic acid are refluxed for about 25 minutes, and then the mixture is poured into 340 cc. of water. A precipitate is formed. It is filtered, digested with 400 cc. of hot alcohol, and filtered hot. The crystals are 2-isopropyl-9-phenyl-2,3-dihydro-1-pyridindene hydrobromide, M. P. 243–245° C.

Example 6

A mixture of 55 grams of n-butylamine hydrochloride, 120 grams of acetophenone, 30 grams of paraformaldehyde and 150 cc. of alcohol is refluxed for several hours. The solvent is distilled off and the residue treated with a dilute solution of sodium hydroxide. After stirring for several hours, the oily base which is formed first, becomes solid. It is filtered and recrystallized from methanol, yielding 1-n-butyl-3-benzoyl-4-hydroxy-4-phenyl-piperidine, M. P. 94–96° C.

Example 7

20 grams of the piperidine base obtained as in Example 6 are dissolved in 80 cc. of 48% hydrobromic acid. The mixture is refluxed, using a column to remove the aqueous hydrobromic acid, until the temperature of the mixture is 122°–125° C. It is then poured into 160 cc. of water, and the precipitate is crystallized from acetone. 2-n-butyl-9-phenyl-2,3-dihydro-1-pyridindene hydrobromide is obtained, melting at 193–195° C.

Example 8

A mixture of 250 grams of p-methyl-acetophenone, 63 grams of methylamine hydrochloride, 55 grams of paraformaldehyde and 225 cc. of ethyl alcohol is refluxed for 2½ to 3 hours. The solvent is removed under reduced pressure. The residue is digested with 200 cc. of ethylacetate. After standing for several hours the solid is filtered and crystallized from about 300 cc. of ethanol. The resulting hydrochloride is stirred vigorously with 10 grams of sodium hydroxide and 540 cc. of water for about one hour at room temperature. On standing the base solidifies. It is filtered and recrystallized from alcohol. Further crystallization from methanol gives pure 1-methyl-3-(p-methylbenzoyl)-4-hydroxy-4-(p-tolyl)-piperidine, M. P. 140–143° C.

Example 9

20 grams of the piperidine derivative obtained as in Example 8 and 80 cc. of 48% hydrobromic acid are refluxed for 30 minutes. The mixture is poured into 160 cc. of water. The precipitate is filtered and recrystallized from about 150 cc. of ethanol. The crude hydrobromide is crystallized from acetic acid, yielding 2,7-dimethyl-9-(p-tolyl)-2,3-dihydro-1-pyridindene hydrobromide, M. P. 200–203° C.

Example 10

A mixture of 134 grams of m-methoxyacetophenone, 34 grams of methylamine hydrochloride, and 30 grams of paraformaldehyde is refluxed in alcohol for several hours. The alcohol is removed, and the residue is added to 600 cc. of water. The aqueous solution is extracted twice with ether, then 240 cc. at 10% sodium hydroxide is added. An oily base separates and is extracted with ether. The solution in ether is dried. An ethereal solution of oxalic acid is added until no further precipitate is formed. The precipitate is filtered and digested with 400 cc. of hot acetone. The oxalate is then stirred with a solution of 20 grams of sodium hydroxide in 1200 cc. of water for 2½ hours. After standing overnight, a solid is obtained. On recrystallization from methanol 1-methyl-3-(m-methoxybenzoyl)-4-hydroxy-4-(m-methoxyphenyl)-piperidine, M. P. 104–106° C., is obtained.

Example 11

2 grams of the piperidine compound as prepared in Example 10 are added slowly to 12 cc. of concentrated sulfuric acid, while the temperature is kept at 0–10° C. by means of an ice-bath. After 20 minutes the mixture is poured onto cracked ice. At a temperature not exceeding 30° C. a solution of sodium hydroxide is added until the mixture reacts distinctly alkaline. A base is liberated which is next extracted with ether. The ethereal solution is treated with gaseous hydrobromic acid. On standing in the cold, crystals slowly appear. They are filtered and recrystallized from alcohol. 2-methyl-6-(or 8)-methoxy-9-(m-methoxyphenyl)-2,3-dihydro-1-pyridindene hydrobromide, M. P. 209–210° C., is obtained.

Example 12

A mixture of 500 grams of N-di-(β-benzoylethyl)-methylamine hydrochloride and 2000 cc. of 48% hydrobromic acid are refluxed for a period of about one hour. Hydrogen chloride was given off, and the temperature rose to 122° C. The contents are poured into 4 liters of cold water. A precipitate formed, which is filtered. The yellow crystals are purified by recrystallization from 1800 cc. of ethyl alcohol. The pure 2-methyl-9-phenyl-2,3-dihydro-1-pyridindene hydrobromide formed has a M. P. of 200–203° C.

Example 13

A mixture of 680 grams of 2-methyl-9-phenyl-2,3-dihydro-1-pyridindene hydrobromide, 6000 cc. of water and about 100 grams of Raney-Nickel catalyst is hydrogenated at room temperature and at about 1000 lbs. pressure for a period of three hours. The catalyst is filtered. The clear filtrate is treated with a solution of 240 grams potassium thiocyanate in 400 cc. of water. A heavy solid precipitates from which the supernatant liquid is decanted. The residue is dissolved in 10 liters of boiling alcohol with stirring in the presence of nitrogen. The solution is cooled to room temperature under nitrogen, and then allowed to stand overnight. 2-methyl-9-phenyl-tetrahydro-1-pyridindene thiocyanate separates in crystals of M. P. 188–189° C. From the concentrated filtrate an additional amount is obtained. The corresponding free base, prepared by treating the slightly soluble thiocyanate in aqueous suspension with sodium hydroxide and extracting with ether, has a M. P. of 90–91° C. It forms a tartrate of M. P. 160° C.

The free base can be represented by the following formula:

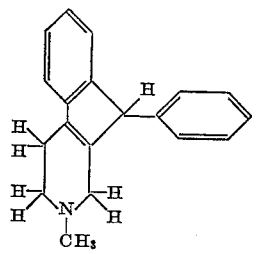

Example 14

A mixture of 17 grams of 2-methyl-9-phenyl-2,3-dihydro-1-pyridindene hydrobromide, 150 cc. of ethanol, and 0.5 grams of platinum oxide catalyst is hydrogenated at 60 lbs. pressure at about 75° C. until no further absorption of hydrogen is noticed. About four hours is required. The catalyst is filtered and the filtrate allowed to stand at room temperature for one day. 8.9 grams of 2-methyl-9-phenyl-hexahydro-1-pyridindene hydrobromide, M. P. 243–246° C., crystallizes. An additional amount is obtained from the filtrate by concentrating to one-half of the original volume and chilling.

While the production of the hydrogenated derivatives of compounds of type I has been illustrated in terms of the production of 2-methyl-9-phenyl-tetrahydro-1-pyridindene and 2-methyl-9-phenyl-hexahydro-1-pyridindene, by following the same procedure as illustrated in the specific examples, but employing other dihydro pyridindenes of type I, as for instance those produced in the above examples, the corresponding tetrahydro and hexahydro pyridindenes can be obtained.

We claim:

1. A 2-alkyl-9-(alkoxy-phenyl)-alkoxy-dihydro-1-pyridindene corresponding to the following formula and its salts:

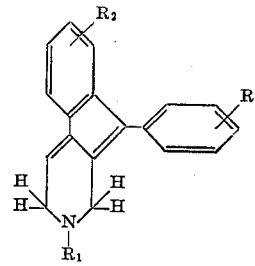

$R_1$ being an alkyl group and $R_2$ and $R_3$ being alkoxy groups.

2. A 2-methyl-9-(m-methoxy-phenyl)-6-methoxy-dihydro-1-pyridindene and the salts thereof corresponding to the following formula:

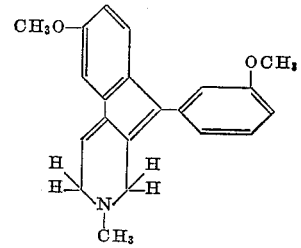

3. A process which comprises reacting 1-methyl-3-(m-methoxybenzoyl)-4-hydroxy-4-(m-methoxyphenyl)-piperidine with sulfuric acid so as to produce a compound corresponding to the following formula:

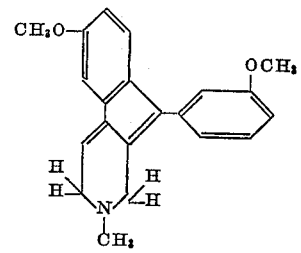

JOHN THOMAS PLATI.
WILHELM WENNER.

No references cited.